US007485037B2

(12) United States Patent
Penrice

(10) Patent No.: US 7,485,037 B2
(45) Date of Patent: Feb. 3, 2009

(54) FIXED-ODDS SPORTS LOTTERY GAME

(75) Inventor: Stephen G. Penrice, Morristown, NJ (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 11/247,709

(22) Filed: Oct. 11, 2005

(65) Prior Publication Data

US 2006/0079312 A1 Apr. 13, 2006

Related U.S. Application Data

(60) Provisional application No. 60/617,816, filed on Oct. 11, 2004.

(51) Int. Cl.

| | |
|---|---|
| ***A63F 9/24*** | (2006.01) |
| ***A63F 13/00*** | (2006.01) |
| ***A63F 1/18*** | (2006.01) |
| ***G06F 17/00*** | (2006.01) |
| ***G06F 19/00*** | (2006.01) |
| ***A63B 71/00*** | (2006.01) |

(52) U.S. Cl. ............................ 463/17; 463/16; 463/21; 463/25; 273/138.1; 273/139; 273/292

(58) Field of Classification Search ............ 463/16–22, 463/25–31, 40–43; 273/269, 138.1, 139, 273/292; 700/90–93

See application file for complete search history.

(56) References Cited

U.S. PATENT DOCUMENTS

| | | | |
|---|---|---|---|
| 1,527,929 | A | 2/1925 | Simons |
| 3,089,123 | A | 5/1963 | Hennis et al. |
| 3,245,697 | A | 4/1966 | BNugent |
| 3,699,311 | A | 10/1972 | Dunbar |

(Continued)

FOREIGN PATENT DOCUMENTS

| | | |
|---|---|---|
| AU | B-18428/92 | 12/1992 |

(Continued)

OTHER PUBLICATIONS

'Are You In?', (Article).

(Continued)

*Primary Examiner*—Robert E Pezzuto
*Assistant Examiner*—Binh-An D. Nguyen
(74) *Attorney, Agent, or Firm*—Dority & Manning, P.A.

(57) ABSTRACT

The present invention relates to a sporting event based lottery game wherein the lottery game result depends on the performance of competitors in the sporting event and the prize determination process does not involve any comparison among the game tickets. The lottery game authority or player selects a sporting event and determines the rules of the lottery game. The rules and the list of competitors in the sporting event are made available to players. The player may be randomly assigned a plurality of competitors that may perform well under the rules of the lottery game and a ticket with the randomly assigned competitors is issued to the player. As the sporting event progresses, a score is assigned to each competitor according to their performance. At the end of the sporting event, the player computes a score for his ticket and if the score is higher than a predetermined score, the player wins a prize.

10 Claims, 6 Drawing Sheets

U.S. PATENT DOCUMENTS

| | | | | |
|---|---|---|---|---|
| 3,736,368 | A | 5/1973 | Vogelman et al. | |
| 3,826,499 | A | 7/1974 | Lenkoff | |
| 3,868,057 | A | 2/1975 | Chavez | |
| 3,876,865 | A | 4/1975 | Bliss | |
| 3,902,253 | A | 9/1975 | Sabuzawa et al. | |
| 3,918,174 | A | 11/1975 | Miller et al. | |
| 3,922,529 | A | 11/1975 | Orloff | |
| 3,934,120 | A | 1/1976 | Maymarev | |
| 4,017,834 | A | 4/1977 | Cuttill et al. | |
| 4,095,824 | A | 6/1978 | Bachman | |
| 4,105,156 | A | 8/1978 | Dethloff | |
| 4,176,406 | A | 11/1979 | Matkan | |
| 4,191,376 | A | 3/1980 | Goldman et al. | |
| 4,194,296 | A | 3/1980 | Pagnozzi et al. | |
| 4,195,772 | A | 4/1980 | Nishimura | |
| 4,206,920 | A | 6/1980 | Weatherford et al. | |
| 4,241,942 | A | 12/1980 | Bachman | |
| 4,243,216 | A | 1/1981 | Mazumber | |
| 4,273,362 | A | 6/1981 | Carrier et al. | |
| 4,309,452 | A | 1/1982 | Sachs | |
| 4,313,087 | A | 1/1982 | Weitzen et al. | |
| 4,355,300 | A | 10/1982 | Weber | |
| 4,375,666 | A | 3/1983 | Buck et al. | |
| 4,398,708 | A | 8/1983 | Goldman et al. | |
| 4,407,443 | A | 10/1983 | McCorkle | |
| 4,451,759 | A | 5/1984 | Heynisch | |
| 4,455,039 | A | 6/1984 | Weitzen et al. | |
| 4,457,430 | A | 7/1984 | Darling et al. | |
| 4,464,423 | A | 8/1984 | LaBianca et al. | |
| 4,466,614 | A | 8/1984 | Bachman et al. | |
| 4,488,646 | A | 12/1984 | McCorkle | |
| 4,491,319 | A | 1/1985 | Nelson | |
| 4,494,197 | A | 1/1985 | Troy et al. | |
| 4,536,218 | A | 8/1985 | Ganho | |
| 4,544,184 | A | 10/1985 | Freund et al. | |
| 4,579,371 | A | 4/1986 | Long et al. | |
| 4,591,189 | A | 5/1986 | Holmen et al. | |
| 4,634,149 | A | 1/1987 | Donovan | |
| 4,665,502 | A | 5/1987 | Kreisner | |
| 4,669,729 | A | 6/1987 | Solitt et al. | |
| 4,689,742 | A | 8/1987 | Troy et al. | |
| 4,726,608 | A | 2/1988 | Walton | |
| 4,736,109 | A | 4/1988 | Dvorzsak | |
| 4,740,016 | A | 4/1988 | Konecny et al. | |
| 4,760,247 | A | 7/1988 | Keane et al. | |
| 4,763,927 | A | 8/1988 | Schneider | |
| 4,775,155 | A | 10/1988 | Lees | |
| 4,792,667 | A | 12/1988 | Chen | |
| 4,805,907 | A | 2/1989 | Hagiwara | |
| 4,817,951 | A | 4/1989 | Crouch et al. | |
| 4,835,624 | A | 5/1989 | Black et al. | |
| 4,836,546 | A | 6/1989 | Dire et al. | |
| 4,836,553 | A | 6/1989 | Suttle et al. | |
| 4,837,728 | A | 6/1989 | Barrie et al. | |
| 4,856,787 | A | 8/1989 | Itkis | |
| 4,861,041 | A | 8/1989 | Jones et al. | |
| 4,870,260 | A | 9/1989 | Niepolomski et al. | |
| 4,880,964 | A | 11/1989 | Donahue | |
| 4,888,964 | A | 12/1989 | Klinge | |
| 4,922,522 | A | 5/1990 | Scanlon | |
| 4,943,090 | A | 7/1990 | Fienberg | |
| 4,960,611 | A | 10/1990 | Fujisawa et al. | |
| 4,961,578 | A | 10/1990 | Chateau | |
| 4,964,642 | A | 10/1990 | Kamille | |
| 4,996,705 | A | 2/1991 | Entenmann et al. | |
| 4,998,010 | A | 3/1991 | Chandler et al. | |
| 4,998,199 | A | 3/1991 | Tashiro et al. | |
| 5,032,708 | A | 7/1991 | Comerford et al. | |
| 5,037,099 | A | 8/1991 | Burtch | |
| 5,046,737 | A | 9/1991 | Fienberg | |
| 5,074,566 | A | 12/1991 | Desbiens | |
| 5,083,815 | A | 1/1992 | Scrymgeour et al. | |
| 5,092,598 | A | 3/1992 | Kamille | |
| 5,094,458 | A | 3/1992 | Kamille | |
| 5,100,139 | A | 3/1992 | Di Bella | |
| 5,109,153 | A | 4/1992 | Johnson et al. | |
| 5,112,050 | A | 5/1992 | Koza et al. | |
| 5,116,049 | A | 5/1992 | Sludikoff et al. | |
| 5,118,109 | A | 6/1992 | Gumina | |
| 5,119,295 | A | 6/1992 | Kapur | |
| 5,158,293 | A | 10/1992 | Mullins | |
| 5,165,967 | A | 11/1992 | Theno et al. | |
| 5,186,463 | A | 2/1993 | Marin et al. | |
| 5,189,292 | A | 2/1993 | Batterman et al. | |
| 5,193,815 | A | 3/1993 | Pollard | |
| 5,193,854 | A | 3/1993 | Borowski, Jr. et al. | |
| 5,228,692 | A | 7/1993 | Carrick et al. | |
| 5,232,221 | A | 8/1993 | Sludikoff et al. | |
| 5,234,798 | A | 8/1993 | Heninger et al. | |
| 5,249,801 | A | 10/1993 | Jarvis | |
| 5,259,616 | A | 11/1993 | Bergmann | |
| 5,273,281 | A | 12/1993 | Lovell | |
| 5,276,980 | A | 1/1994 | Carter et al. | |
| 5,282,620 | A | 2/1994 | Keesee | |
| 5,308,992 | A | 5/1994 | Crane et al. | |
| 5,317,135 | A | 5/1994 | Finocchio | |
| 5,326,104 | A | 7/1994 | Pease et al. | |
| 5,332,219 | A | 7/1994 | Marnell, II et al. | |
| 5,342,047 | A | 8/1994 | Hiedel et al. | |
| 5,342,049 | A | 8/1994 | Wichinsky et al. | |
| 5,344,144 | A | 9/1994 | Canon | |
| 5,346,258 | A | 9/1994 | Behn et al. | |
| 5,380,007 | A | 1/1995 | Travis et al. | |
| 5,393,057 | A | 2/1995 | Marnell, II et al. | |
| 5,401,024 | A | 3/1995 | Simunek | |
| 5,403,039 | A | 4/1995 | Borowski, Jr. et al. | |
| 5,407,199 | A | 4/1995 | Gumina | |
| 5,420,406 | A | 5/1995 | Izawa et al. | |
| 5,432,005 | A | 7/1995 | Tanigami et al. | |
| 5,451,052 | A | 9/1995 | Behm et al. | |
| 5,456,465 | A | 10/1995 | Durham | |
| 5,456,602 | A | 10/1995 | Sakuma | |
| 5,471,039 | A | 11/1995 | May | |
| 5,475,205 | A | 12/1995 | Behm et al. | |
| 5,486,005 | A | 1/1996 | Neal | |
| 5,513,846 | A | 5/1996 | Niederlein et al. | |
| 5,518,239 | A * | 5/1996 | Johnston | 273/139 |
| 5,528,154 | A | 6/1996 | Leichner et al. | |
| 5,536,016 | A | 7/1996 | Thompson | |
| 5,540,442 | A | 7/1996 | Orselli et al. | |
| 5,548,110 | A | 8/1996 | Storch et al. | |
| 5,550,746 | A | 8/1996 | Jacobs | |
| 5,560,610 | A | 10/1996 | Behm et al. | |
| 5,564,700 | A | 10/1996 | Celona | |
| 5,564,977 | A | 10/1996 | Algie | |
| 5,591,956 | A | 1/1997 | Longacre, Jr. et al. | |
| 5,599,046 | A | 2/1997 | Behm et al. | |
| 5,602,381 | A | 2/1997 | Hoshino et al. | |
| 5,621,200 | A | 4/1997 | Irwin et al. | |
| 5,628,684 | A | 5/1997 | Bouedec | |
| 5,630,753 | A | 5/1997 | Fuchs | |
| 5,651,735 | A | 7/1997 | Baba | |
| 5,655,961 | A | 8/1997 | Acres et al. | |
| 5,667,250 | A | 9/1997 | Behm et al. | |
| 5,682,819 | A | 11/1997 | Beatty | |
| 5,690,366 | A | 11/1997 | Luciano | |
| 5,704,647 | A | 1/1998 | Desbiens | |
| 5,722,891 | A | 3/1998 | Inoue | |
| 5,726,898 | A | 3/1998 | Jacobs | |
| 5,732,948 | A | 3/1998 | Yoseloff | |
| 5,741,183 | A | 4/1998 | Acres et al. | |
| 5,743,800 | A | 4/1998 | Huard et al. | |
| 5,752,882 | A | 5/1998 | Acres et al. | |
| 5,756,220 | A | 5/1998 | Hoshino et al. | |

| | | | | |
|---|---|---|---|---|
| 5,768,142 | A | 6/1998 | Jacobs | |
| 5,769,458 | A | 6/1998 | Carides et al. | |
| 5,770,533 | A | 6/1998 | Franchi | |
| 5,772,509 | A | 6/1998 | Weiss | |
| 5,772,510 | A | 6/1998 | Roberts | |
| 5,772,511 | A | 6/1998 | Smeltzer | |
| RE35,864 | E | 7/1998 | Weingardt | |
| 5,779,840 | A | 7/1998 | Boris | |
| 5,789,459 | A | 8/1998 | Inagaki et al. | |
| 5,791,990 | A | 8/1998 | Schroeder et al. | |
| 5,797,794 | A | 8/1998 | Angell | |
| 5,803,504 | A | 9/1998 | Deshiens et al. | |
| 5,816,920 | A | 10/1998 | Hanai | |
| 5,818,019 | A | 10/1998 | Irwin, Jr. et al. | |
| 5,820,459 | A | 10/1998 | Acres et al. | |
| 5,823,874 | A | 10/1998 | Adams | |
| 5,830,063 | A | 11/1998 | Byrne | |
| 5,830,066 | A | 11/1998 | Goden et al. | |
| 5,830,067 | A | 11/1998 | Graves et al. | |
| 5,833,537 | A | 11/1998 | Barrie | |
| 5,835,576 | A | 11/1998 | Katz et al. | |
| 5,836,086 | A | 11/1998 | Elder | |
| 5,836,817 | A | 11/1998 | Acres et al. | |
| 5,848,932 | A | 12/1998 | Adams | |
| 5,863,075 | A | 1/1999 | Rich et al. | |
| 5,871,398 | A | 2/1999 | Schneier et al. | |
| 5,876,284 | A | 3/1999 | Acres et al. | |
| 5,882,261 | A | 3/1999 | Adams | |
| 5,883,537 | A | 3/1999 | Luoni et al. | |
| 5,885,158 | A | 3/1999 | Torango et al. | |
| 5,887,906 | A | 3/1999 | Sultan | |
| 5,903,340 | A | 5/1999 | Lawandy et al. | |
| 5,911,418 | A | 6/1999 | Adams | |
| 5,915,588 | A | 6/1999 | Stoken et al. | |
| 5,934,671 | A | 8/1999 | Harrison | |
| 5,938,200 | A * | 8/1999 | Markowicz et al. | 273/246 |
| 5,970,143 | A | 10/1999 | Schneier et al. | |
| 5,979,894 | A | 11/1999 | Alexoff | |
| 5,996,997 | A | 12/1999 | Kamille | |
| 5,997,044 | A | 12/1999 | Behm et al. | |
| 6,003,307 | A | 12/1999 | Naber et al. | |
| 6,004,207 | A | 12/1999 | Wilson, Jr. et al. | |
| 6,007,162 | A | 12/1999 | Hinz et al. | |
| 6,012,982 | A | 1/2000 | Piechowiak et al. | |
| 6,014,032 | A | 1/2000 | Maddix et al. | |
| 6,015,345 | A * | 1/2000 | Kail | 463/16 |
| 6,017,032 | A | 1/2000 | Grippo et al. | |
| 6,024,641 | A | 2/2000 | Sarno | |
| 6,053,405 | A | 4/2000 | Irwin, Jr. et al. | |
| 6,077,162 | A | 6/2000 | Weiss | |
| 6,080,062 | A | 6/2000 | Olson | |
| 6,086,477 | A | 7/2000 | Walker et al. | |
| 6,089,978 | A | 7/2000 | Adams | |
| 6,099,407 | A | 8/2000 | Parker, Jr. et al. | |
| 6,102,400 | A | 8/2000 | Scott et al. | |
| 6,107,913 | A | 8/2000 | Gatto et al. | |
| 6,119,364 | A | 9/2000 | Elder | |
| 6,125,368 | A | 9/2000 | Bridge et al. | |
| 6,142,872 | A | 11/2000 | Walker et al. | |
| 6,146,272 | A | 11/2000 | Walker et al. | |
| 6,149,521 | A | 11/2000 | Sanduski | |
| 6,155,491 | A | 12/2000 | Dueker et al. | |
| 6,168,521 | B1 | 1/2001 | Luciano et al. | |
| 6,168,522 | B1 | 1/2001 | Walker et al. | |
| 6,179,710 | B1 | 1/2001 | Sawyer et al. | |
| 6,186,502 | B1 * | 2/2001 | Perkins | 273/138.1 |
| 6,203,430 | B1 | 3/2001 | Walker et al. | |
| 6,206,373 | B1 | 3/2001 | Garrod | |
| 6,210,275 | B1 | 4/2001 | Olsen | |
| 6,217,448 | B1 | 4/2001 | Olsen | |
| 6,220,961 | B1 | 4/2001 | Keane et al. | |
| 6,224,055 | B1 | 5/2001 | Walker et al. | |
| 6,227,969 | B1 | 5/2001 | Yoseloff | |
| 6,238,288 | B1 | 5/2001 | Walker et al. | |
| 6,309,300 | B1 | 10/2001 | Glavich | |
| 6,312,334 | B1 | 11/2001 | Yoseloff | |
| 6,315,291 | B1 | 11/2001 | Moody | |
| 6,330,976 | B1 | 12/2001 | Dymetman et al. | |
| 6,331,143 | B1 | 12/2001 | Yoseloff | |
| 6,334,814 | B1 | 1/2002 | Adams | |
| 6,340,158 | B2 | 1/2002 | Pierce et al. | |
| 6,368,213 | B1 | 4/2002 | McNabola | |
| 6,375,568 | B1 | 4/2002 | Roffman et al. | |
| 6,379,742 | B1 | 4/2002 | Behm et al. | |
| 6,394,899 | B1 | 5/2002 | Walker et al. | |
| 6,398,214 | B1 | 6/2002 | Moteki et al. | |
| 6,398,643 | B1 | 6/2002 | Knowles et al. | |
| 6,398,644 | B1 | 6/2002 | Perrie et al. | |
| 6,398,645 | B1 | 6/2002 | Yoseloff | |
| 6,416,408 | B2 | 7/2002 | Tracy et al. | |
| 6,419,579 | B1 | 7/2002 | Bennett | |
| 6,435,408 | B1 | 8/2002 | Irwin, Jr. et al. | |
| 6,435,500 | B2 | 8/2002 | Gumina | |
| 6,478,677 | B1 | 11/2002 | Moody | |
| 6,491,215 | B1 | 12/2002 | Irwin, Jr. et al. | |
| 6,497,408 | B1 | 12/2002 | Walker et al. | |
| 6,552,290 | B1 | 4/2003 | Lawandy | |
| 6,588,747 | B1 | 7/2003 | Seelig | |
| 6,599,186 | B1 | 7/2003 | Walker et al. | |
| 6,601,772 | B1 | 8/2003 | Rubin et al. | |
| 6,637,747 | B1 | 10/2003 | Garrod | |
| 6,648,735 | B2 | 11/2003 | Miyashita et al. | |
| 6,648,753 | B1 | 11/2003 | Tracy et al. | |
| 6,648,755 | B1 | 11/2003 | Luciano et al. | |
| 6,676,126 | B1 | 1/2004 | Walker et al. | |
| 6,692,354 | B2 | 2/2004 | Tracy et al. | |
| 6,702,047 | B2 | 3/2004 | Huber | |
| 6,773,345 | B2 | 8/2004 | Walker et al. | |
| 6,776,337 | B2 | 8/2004 | Irwin, Jr. et al. | |
| 6,786,824 | B2 | 9/2004 | Cannon | |
| 6,823,874 | B2 | 11/2004 | Lexcen | |
| 6,875,105 | B1 | 4/2005 | Behm et al. | |
| 6,929,186 | B2 | 8/2005 | Lapstun | |
| 2001/0027130 | A1 | 10/2001 | Namba et al. | |
| 2001/0030978 | A1 | 10/2001 | Holloway et al. | |
| 2001/0034262 | A1 | 10/2001 | Banyal | |
| 2001/0040345 | A1 | 11/2001 | Au-Yeung | |
| 2001/0044336 | A1 * | 11/2001 | Reiss et al. | 463/17 |
| 2002/0022511 | A1 | 2/2002 | Eklund et al. | |
| 2002/0084335 | A1 | 7/2002 | Ericson | |
| 2002/0171201 | A1 | 11/2002 | Au-Yeung | |
| 2002/0187825 | A1 | 12/2002 | Tracy et al. | |
| 2003/0050109 | A1 | 3/2003 | Caro et al. | |
| 2003/0114210 | A1 | 6/2003 | Meyer et al. | |
| 2003/0224854 | A1 * | 12/2003 | Joao | 463/40 |
| 2004/0029627 | A1 * | 2/2004 | Hannan et al. | 463/1 |
| 2004/0076310 | A1 | 4/2004 | Hersch et al. | |
| 2004/0173965 | A1 | 9/2004 | Stanek | |
| 2004/0178582 | A1 | 9/2004 | Garrod | |
| 2004/0185931 | A1 | 9/2004 | Hartman et al. | |
| 2004/0204222 | A1 | 10/2004 | Roberts | |
| 2004/0259631 | A1 | 12/2004 | Katz et al. | |
| 2004/0266514 | A1 | 12/2004 | Penrice | |
| 2005/0026670 | A1 * | 2/2005 | Lardie | 463/16 |
| 2005/0093228 | A1 * | 5/2005 | Brian, III | 273/138.1 |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C2 | 4/1981 |
| DE | 3035898 | A1 | 4/1982 |

| | | | |
|---|---|---|---|
| DE | 3035947 | A1 | 5/1982 |
| DE | 2938307 | C3 | 6/1982 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29803107 | U1 | 8/1998 |
| DE | 29816453 | U1 | 4/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 529535 | | 6/1983 |
| ES | 529536 | | 6/1983 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| JP | 02235744 | | 9/1990 |
| JP | 04132672 | | 5/1992 |
| WO | WO85/02250 | A1 | 5/1985 |
| WO | WO91/17529 | | 11/1991 |
| WO | WO 98/03910 | | 1/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO01/74460 | A2 | 11/2001 |
| WO | WO01/93966 | A1 | 12/2001 |
| WO | WO02/056266 | A1 | 7/2002 |

OTHER PUBLICATIONS

'Beginner's Guide-How To Bet', (www.plimico.com/How+to +wager/beginnersguide/), (Internet Article), 3 Pgs.
Chip Brown, 'Austin American-Statesman', (Article), May 28, 1998, 2 Pgs., Texas.
John C. Hallyburton, Jr., 'Frequently Asked Questions About Keno', (Internet Article), 1995, 1998, 10 Pgs., (http://conielco.com/faq/keno.html).
'Horse betting Tutorial-Types of Bets'(www.homepokergames.com/horsebettingtutorial.php), (Internet Article), 2 Pgs.
Judith Gaines, 'Pool Party Betting Business Booming Throughout Area Workplaces', (Internet Article), Mar. 19, 1994, 2 Pgs., Issue 07431791, Boston Globe, Boston, MA.
'Maryland Launches Let It Ride', (Internet Article), Circa 2001, 1 Pg.
'Notice of Final Rulemaking', (Internet Article) Mar. 24, 2000, 10 Pgs., vol. 6, Issue #13, Arizona Administrative Register, Arizona.
'How To Play Megabucks', (Internet Article), Mar. 9, 2001, 2 Pgs., Oregon Lottery Megabucks,(http://www.oregonlottery.org/mega/m_howto.htm).
'How To Play Megabucks', (Internet Article), May 8, 2001, 2 Pgs., Oregon Lottery Megabucks, (http://www.oregonlottery.org/mega/m_howto.htm).
'Oregon Lottery', (Internet Article), Apr. 30, 2004, 9 Pgs., Oregon Lottery Web Center, (http://www.oregonlottery.org/general/g_hist.shtml).
'Powerball Odd & Prizes', 'How to Play Powerball', (Internet Article), Dec. 2002, 2 Pgs., (www.powerball.com/pbhowtoplay.shtm).
'Powerball Prizes and Odds', (Internet Article), 2 Pgs., http://www.powerball.com/pbprizesNOdds.shtm.
'Learn To Play Races' (Internet Article), 15 Pgs., Racing Daily Form (www.drf.com).
Mike Parker, 'The History of Horse Racing' (Internet Article), 1996, 1997, 1998, 5 Pgs., http://www.mrmike.com/explore/hrhist.htm.

* cited by examiner

200

| Result 202 | Approximate Prize 204 | Odds* 206 |
|---|---|---|
| 208 Top 4 teams, in correct order | $300,000 | 1 in 863,040 |
| 210 Top 4 teams, not in correct order | $1,000 | 1 in 37,523 |
| 11 points | $500 | 1 in 8,990 |
| 10 points | $100 | 1 in 1,124 |
| 9 points | $70 | 1 in 562 |
| 8 points | $20 | 1 in 158 |
| 6-7 points | $5 | 1 in 22 |
| Overall | | 1 in 18 |

FIG. 2

400

| Result (402) | Approximate Prize (404) | Odds* (406) |
|---|---|---|
| 408 15 points, correct champion | $75,000 | 1 in 205,920 |
| 410 15 points, incorrect champion | $2,000 | 1 in 13,728 |
| 14 points | $70 | 1 in 420 |
| 13 points | $10 | 1 in 70 |
| 12 points | $5 | 1 in 28 |
| Overall | | 1 in 18 |

FIG. 4

FIXED-ODDS SPORTS LOTTERY GAME

CROSS-REFERENCE TO RELATED APPLICATION

This application claims the benefit of U.S. Provisional Application No. 60/617,816, filed on Oct. 11, 2004, the entirety of which is hereby incorporated herein by this reference.

BACKGROUND OF THE INVENTION

1. Field of the Invention

The invention relates generally to a lottery game, and more particularly to a lottery game in which a game piece accumulates points according to the performance of the participants of a sporting event.

2. Description of the Related Art

Many governments and/or gaming organizations sponsor wagering games known as lotteries. A typical lottery game entails players selecting permutations or combinations of numbers. This is followed by a "draw," wherein the lottery randomly selects a combination or permutation of numbered balls. Prizes are awarded based on the number of matches between a player's selection and the drawn numbers. The drawn numbers are well-publicized, and multi-million-dollar-jackpot lotteries are popular throughout the world.

Lotteries have become an important source of income to governments as they shoulder much of the financial burden for education and other programs. However, as governments have grown more dependent on lotteries it has become a challenge to sustain public interest therein. One approach to invigorating lottery sales is to expand game content beyond traditional combination/permutation games in the hope that the new games will help keep current players, as well as draw in new players.

In the pursuit of new lottery games, certain goals must be met. The lottery must be able to control the payout to the player. Ideally, the payout should be the same for all players regardless of skill. Short of that, the expected payout should fall within a range, i.e., there is an acceptable lower and upper bound to the expected player payout. Even in jurisdictions where lottery games are allowed to have elements of skill, such elements may limit the market for the game. In particular, games that involve skill-based sports wagering tend to exclude potential players who enjoy following sports but who lack confidence in their ability to predict outcomes.

There are also certain features of traditional lottery games that appeal to players and that ideally should be retained as new content is developed. One of the characteristics of a traditional lottery game is that players can win a prize for achieving a specific outcome, regardless of how many other players have achieved that outcome.

For example, a typical "lotto" game requires players to choose six distinct numbers from the set of integers ranging from to 49. Once the game sales are cut off, the lottery then chooses or "draws" six integers from the same set at which point all players whose selections match 3, 4, 5, or 6 of the lottery's selections win a prize, as established by the lottery. Thus the laws of probability, not the rules of the game, control the number of winners. Moreover, players can determine whether they have won a prize without any knowledge of how other players have fared. In particular, a player will never have the disappointing experience of believing that his outcome was good enough to win a prize only to learn later that he has not won because too many other players had better outcomes.

A means of controlling the number of winners is particularly important when awarding "churn" prizes, small prizes that are won relatively frequently and that help to maintain players' interest. Without some control on the number of winners, the lottery risks having a disproportionate number of churn-prize winners, forcing it either to pay out more than it had budgeted for these prizes, or to award small prizes that players find disappointing, if not insulting.

One approach to developing new lottery games is disclosed in U.S. Pat. No. 6,656,042, which discloses a system and method for playing an interactive lottery game having results based on the outcome of sporting events. In the embodiment described in the '042 patent, the player receives a game piece listing three athletes (a basketball player, an auto racer, and a hockey player) and three upcoming sporting events in which the athletes will participate. The performance of the athletes in these events determines the value, measured in "points," of the game piece. For example, the game piece acquires points whenever the basketball player scores a point or makes an assist. The winning game piece is the one that has the greatest accumulated point value, with ties broken by some rule decided in advance.

A limitation of the method described in the '042 patent is that it does not provide a mechanism for awarding prizes based on the number of points accumulated. In this sense, it fails to meet the expectations of traditional lottery players that meeting a specific criterion, independent of other lottery players' outcomes, should qualify a player for a prize. As disclosed, a suitable lottery game or method will not have this feature as it is impossible to say in advance how many points will be available and how they will be distributed among the athletes participating in the given events. For example, in the sample embodiment, the first portion of the ticket refers to a basketball player who will play in a game against the Los Angeles Lakers, for example. One cannot say in advance how many points will be scored against the Lakers. Even if one could say that 100 points, for example, would be scored, it is possible that 10 players could score 10 points each or that 5 players could score 20 points each. Thus it is not possible to derive a probability distribution on the total number of points a game piece might achieve, and therefore a given point level might be achieved by a very large or very small number of game pieces, even if the indicia are randomly distributed among the game pieces. As a result, prizes are necessarily based on the relative values of the game pieces.

Another method for playing a fantasy sports game related to an elimination tournament is disclosed by U. S. Pat. No. 6,669,565. This method has a substantial skill element, however, and therefore has the limitations for use with a lottery game as described above. See also Combinatorial Algorithms: Generation, Enumeration, and Search, Donald L. Kreher and Douglas R. Stinson., CRC Press, Boca Raton, Fla. 1998; and Enumerative S, Vol. 1, Richard P. Stanley, Wadsworth & Brooks/Cole, Monterrey, Calif., 1986, generally.

The present invention is therefore directed to a sporting event based lottery game wherein the lottery game result depends on the performance of competitors in the sporting event and the prize determination process does not involve any comparison among the game tickets.

SUMMARY OF THE INVENTION

The invention comprises a sports lottery in which a game piece accumulates points according to the performance of sports figures that are represented by indicia on the game piece in which prizes are awarded to players holding game pieces that accumulate a number of points that is specified before a selected sports event competition begins. In particular, the prize determination process does not involve any comparison among the game pieces. The present invention has no skill element, and because of the structure of the tournament, it is possible, as will be explained, to compute probabilities of specific outcomes and to award prizes based on these outcomes.

In one embodiment, the invention is a method of playing a fixed-odds sporting event based lottery game wherein a pool of competitors compete in the sporting event. The method includes selecting a plurality of competitors from the pool of competitors, assigning an individual score to each of the plurality of competitors according to their individual performance in the sporting event, determining a total score for the plurality of competitors based on the individual score of each of the plurality of competitors, and receiving a prize according to the total score.

BRIEF DESCRIPTION OF THE DRAWINGS

FIG. 2 is a first embodiment of a prize table for the lottery game.

FIG. 4 is a second embodiment of a prize table for the lottery game.

DETAILED DESCRIPTION OF THE INVENTION

Figure 1:
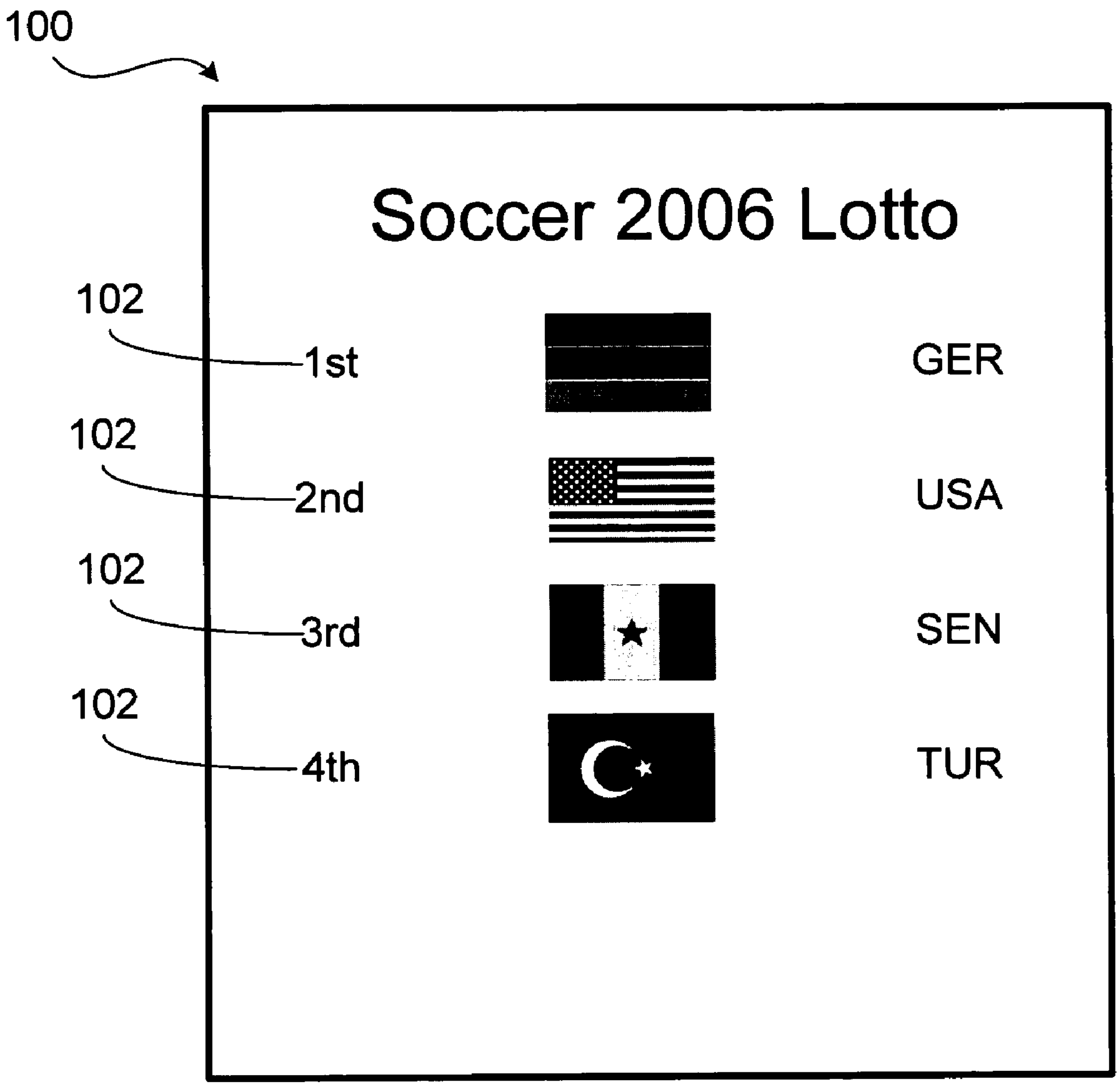
FIG. 1 is a first embodiment of a lottery game ticket of the present invention.

In this description, teams, participants and competitors, are used interchangeably. The present invention relates to a lottery game where the game outcomes are determined by the performances of teams or players that are competing in a tournament, wherein at the end of the tournament the participants will have been partitioned into a plurality of categories and the plurality of participants in each category is predetermined by the rules of the tournament. For example, a 4-team basketball tournament is being held in which on the first day Teams A and B play each other and Teams C and D play each other, and on the second day the previous day's winners play each other for $1^{st}$ place, and the previous day's losers play each other for 3 rd place (The losers of the second day's games finish $2^{nd}$ and $4^{th}$, respectively). There are at least two ways to categorize these teams based on the results of the tournament. One could categorize them as the $1^{st}$, $2^{nd}$, $3^{rd}$, and $4^{th}$ place teams (one team in each category), or one could categorize them by the number of games that they won: 2, 1, or 0 (1 team, 2 teams, and 1 team in these categories, respectively). The relevant feature common to both systems is that one can say with certainty in advance how many teams will be in each category, even if the particular teams in a category cannot be predicted.

In one embodiment of the invention, the sponsoring organization offers for sale tickets that list one or more indicia corresponding to participants or competitors in the tournament. This list is randomly selected by means of a random number generator that resides on some part of the lottery system. Depending on the particular embodiment, the order of the list may or may not be relevant to the outcome of the lottery game. As the tournament progresses, participants may earn points for every round of the tournament in which they advance or otherwise earn points based on the category determined by their performance. The point value of a ticket is the total number of points earned by the participants represented by the indicia on the ticket. Tickets of equal point value may be further distinguished from each other on the basis of the degree to which the order of the indicia on the ticket corresponds to the relative performance in the tournament of the participants represented by the game indicia.

At the time the lottery game is offered, the lottery authority provides players with a prize table that lists the possible outcomes that a ticket may achieve together with prize values that correspond to those outcomes. This prize table can be made available to each point of sale of lottery tickets. Depending on the lottery authority's preference, the prize values may be set amounts or they may be estimated average values based on the percentage of sales that are allocated to funding that prize level coupled with the mathematical expectation of the number of winners for that outcome. In either case, a crucial element of the prize table is the odds or probability of each outcome. The method for computing these odds is discussed in the sample embodiments below.

In another embodiment of the game, the game outcomes may be based upon the total point values for the tickets. A given point value may be subdivided into two or more outcomes based on the order of the participants listed on the ticket, as is also illustrated in the sample embodiments below.

After the tournament is completed, the lottery's central system, which includes a computerized network as known to those skilled in the art, will determine the value of each ticket by determining the number of points the ticket has earned, applying criteria, if any, related to the order of the indicia, and using the prize table to determine the prize value of the ticket, if any. Players may then collect their winnings by having their lottery game tickets validated by an authorized lottery retailer. Moreover, if the lottery's system supports player accounts, the players' winnings may be automatically credited to their respective lottery accounts.

Yet another embodiment of this invention may be based on a soccer tournament, for example the World Cup, in which 32 teams compete for the championship. The first round of the tournament consists of round-robin play in 8 groups of 4 teams each, with the top 2 teams from each group advancing to the elimination portion of the tournament. Once 16 teams have been determined, they play in elimination rounds, where 8 teams, then 4 teams, then 2 teams, are eliminated from championship contention. The final 2 teams play against each other for the championship. In addition, the 2 teams that were eliminated in the semi-finals play against each other for 3 rd place. Thus there are a total of 16 matches played after the initial round-robin matches. Moreover, one can see that at the end of the tournament 1 team will have won 4 of these matches, 2 teams will have won 3 matches, 1 team will have won 2 matches, 8 teams will have won 1 match, and the other 24 teams that started the tournament will not win any elimination-round matches, either because they did not qualify for that portion of the tournament or because they lost their first elimination match. Thus the number of matches won is a basis for partitioning the participating teams into 5 categories.

In the sample embodiment, a lottery player purchases for $2, although any desired form of currency and in any desired amount as established by the sponsoring lottery organization, a ticket 100 as illustrated in FIG. 1. The player may be randomly assigned four competitors in the sporting event and an order for the selected competitors as shown in FIG. 1. The ticket 100 lists Germany, the United States, Senegal, and Turkey, and the order of the entire list will be relevant to one of the prize levels. The teams on the ticket earn a point for every match they win in the elimination portion of the tournament.

FIG. 2 illustrates a prize table 200 that may be printed on the reverse side of the lottery ticket 100. The prize table 200 is divided into three columns. The first column 202 lists the possible results for the tournament. The second column 204 lists prizes for each result listed. The third column 206 lists odds for each listed result. For the example of the World Cup, the tickets that earn 12 points are precisely those four teams reached the semi-finals of the sporting event. If the order of the teams on such a ticket exactly matches the order that those teams finished in the tournament, then the ticket wins a share of the top prize. Otherwise, the ticket wins a second prize.

The following example shows how the odds may be computed for this type of lottery game. Consider the event where a ticket earns exactly 9 points. This can happen in one of three ways: a) 1 team on the ticket earns 4 points, 1 earns 3 points, and 2 earn 1 point; b) 1 team earns 4 points, 1 earns 3 points, 1 earns 2 points, and 1 earns none; or c) 2 teams earn three points, 1 earns 2 points, and 1 earns point. Since the teams are placed on the tickets randomly, the probability of each case can be computed as follows.

$$a)\ \frac{\binom{1}{1}\binom{2}{1}\binom{1}{0}\binom{4}{2}\binom{24}{0}}{\binom{32}{4}} \approx 0.0003337$$

$$b)\ \frac{\binom{1}{1}\binom{2}{1}\binom{1}{1}\binom{4}{0}\binom{24}{1}}{\binom{32}{4}} \approx 0.0013348$$

$$c)\ \frac{\binom{1}{0}\binom{2}{2}\binom{1}{1}\binom{4}{1}\binom{24}{0}}{\binom{32}{4}} \approx 0.0001112$$

Thus the total probability of earning 9 points is 0.0017798, or approximately 1 in 562.

Note that in general, if k objects are selected from a set S of cardinality n that is partitioned into subsets $S_1, S_2, \ldots, S_m$ with cardinalities $n_1, n_2, \ldots, n_m$ respectively, then for non-negative integers $k_1, k_2, \ldots, k_m$ with $k_1+k_2+\ldots+k_m=k$ the probability that exactly $k_i$, of the objects are from $S_i$, for $i=1, \ldots, m$ is $$\frac{\binom{n_1}{k_1}\binom{n_2}{k_2}\cdots\binom{nm}{km}}{\binom{n}{k}}$$

Where $$\binom{i}{j}$$

denotes a binomial coefficient and by convention $$\binom{i}{j} \equiv 0 \quad \text{if } i < j.$$

The rest of the prize table is computed similarly, with the exception of the top two prize tiers. Using the method showed above, one can compute that the probability of a ticket earning 12 points is $$\frac{\binom{1}{1}\binom{2}{2}\binom{1}{1}\binom{4}{0}\binom{24}{0}}{\binom{32}{4}} \approx 0.000028$$

since the only way to earn 12 points is to have the four semi-finalists on the ticket. Thus the probability of winning the top prize is $$\frac{\binom{1}{1}\binom{2}{2}\binom{1}{1}\binom{4}{0}\binom{24}{0}}{24\binom{32}{4}} \approx 0.00000116$$

and the probability of winning a second prize is $$\frac{23\binom{1}{1}\binom{2}{2}\binom{1}{1}\binom{4}{0}\binom{24}{0}}{24\binom{32}{4}} \approx 0.00002665$$

because there are 24 ways to order the 4 teams.

The computation of these odds is facilitated by a method of automatically generating a list of all possible ways of expressing a positive integer n as an ordered sum of k nonnegative integers. For example, in the calculations above one may make use of a list of all the possible ways of writing 4 as a sum of 5 nonnegative integers, where order matters, i.e. 0+2+0+1+1 is distinct from 1+1+0+0+2. It is well known within combinatorial mathematics that these can be put in one-to-one correspondence with (k−1)−element subsets of a (n+k−1)−element set; see for example pp. 14-15 of Stanley's Enumerative Combinatorics, Vol. 1. Methods for generating all such subsets are also well-known; see pp. 43-52 of Kreher and Stinson's Combinatorial Mathematics: Generation, Enumeration, and Search.

Figure 3:
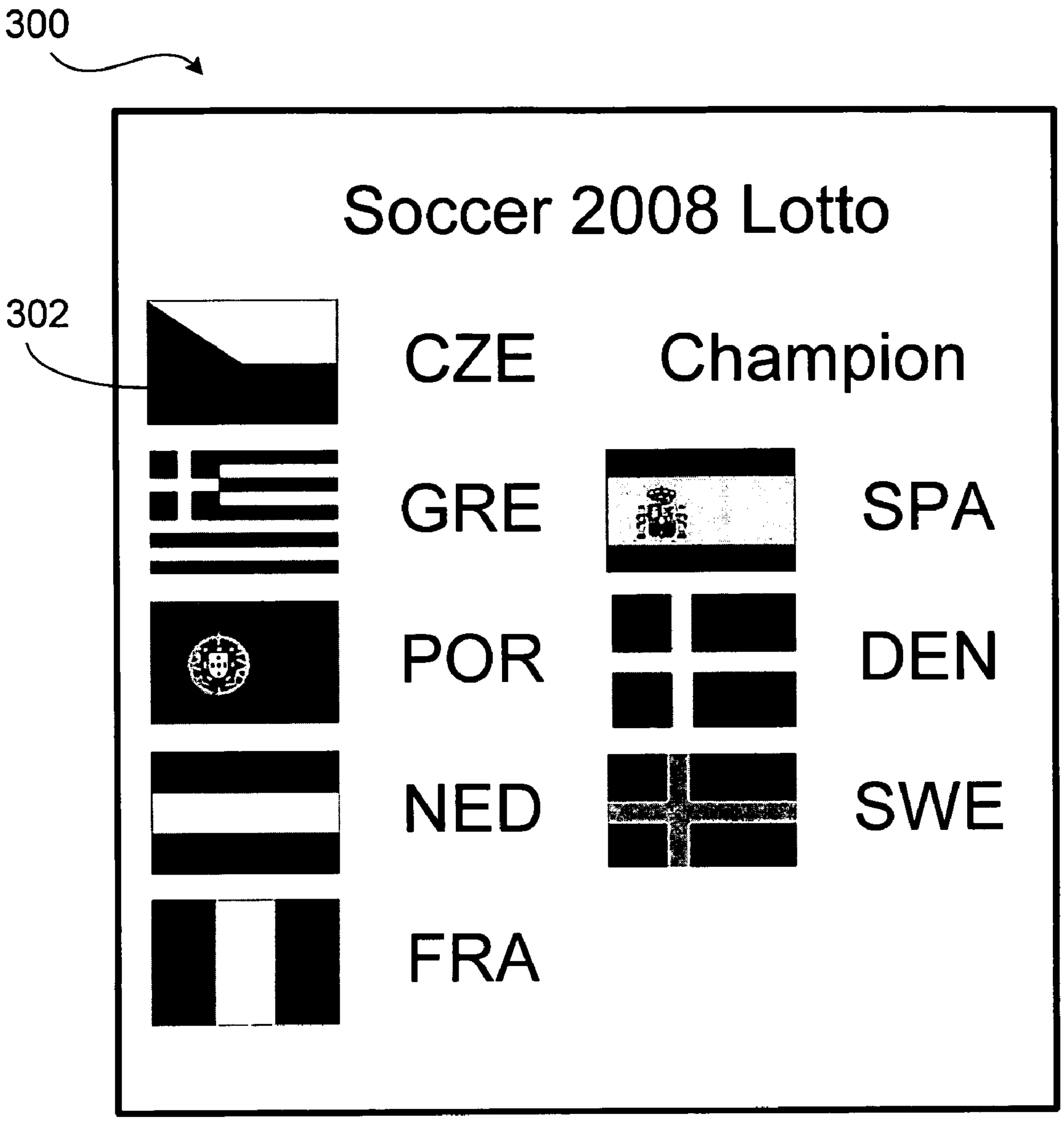
FIG. 3 is a second embodiment of a lottery game ticket of the present invention.

Another sample embodiment is based on a soccer tournament in which there are 16 teams, 8 of whom progress to the elimination rounds. From this point on the tournament progresses in the same way as in the previous embodiment, except that there is no match to determine the $3^{rd}$ place team. Accordingly, in this embodiment illustrated by FIG. 3, a lottery player purchases a ticket 300 that lists 8 of the 16 teams. The first team 302 listed on the ticket is designated as the predicted champion; otherwise, the order of the teams on the ticket is not relevant to prize awards. The teams on the ticket earn 1 point for qualifying for the quarter-finals plus 1 point for each match won in the quarter-finals, semi-finals, or finals. Tickets that earn a total of 12 to 14 points are awarded prizes based on the prize table 400 in FIG. 4. Tickets that earn 15 points are precisely those whose 8 teams reached the quarter-finals. If the first team on such a ticket wins the championship, then the ticket wins a share of the top prize. Otherwise, the ticket wins a second prize.

Figure 5:
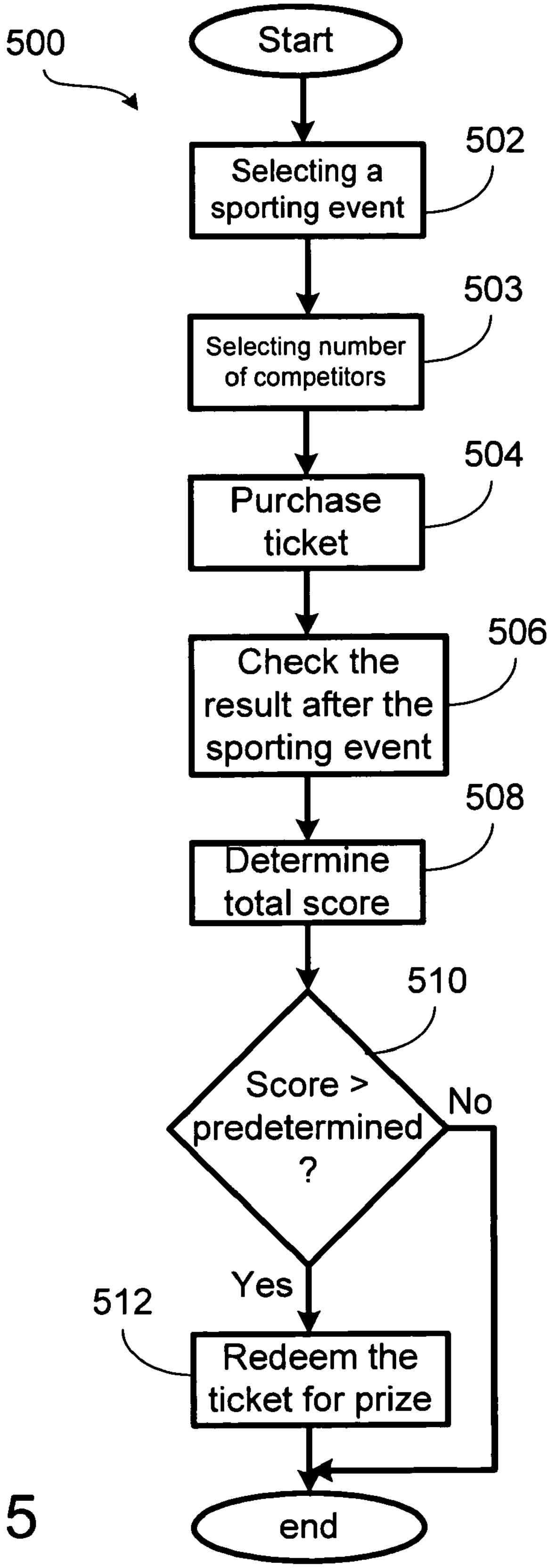
FIG. 5 is a flow chart for a player process according to one embodiment of the invention.

FIG. 5 illustrates a flow chart 500 for a player process. When a player is ready to purchase a ticket of the lottery game according to the present invention, the player first select a sporting event, step 502, then selects the number of competitors step 503, and purchase a ticket with the selected sporting event and the randomly assigned competitors, step 504. For example, if the player selects the National Basketball Association (NBA) playoff tournament as the sporting event and 3 as the number of competitors, the player may be randomly assigned L.A. Lakers, Atlanta Hawks, and Detroit Pistons as 3 of the 16 teams that entered the playoff phase. After purchasing the ticket, the player follows the NBA playoff tournament and checks the results, step 506. After the player checks the results, the player computes the scores of the competing teams listed on his tickets, step 508. The computation of the scores is done according to a set of predefined rules, for example for each series' win, the winning competitor wins one point and the losing competitor earns no point. At the end of the tournament, when all the series have been played, the player computes the final score and checks whether the score is higher than a predetermined score, step 510. If the score is higher than the predetermined score, the player can then redeem the ticket for a prize, step 512.

Figure 6:
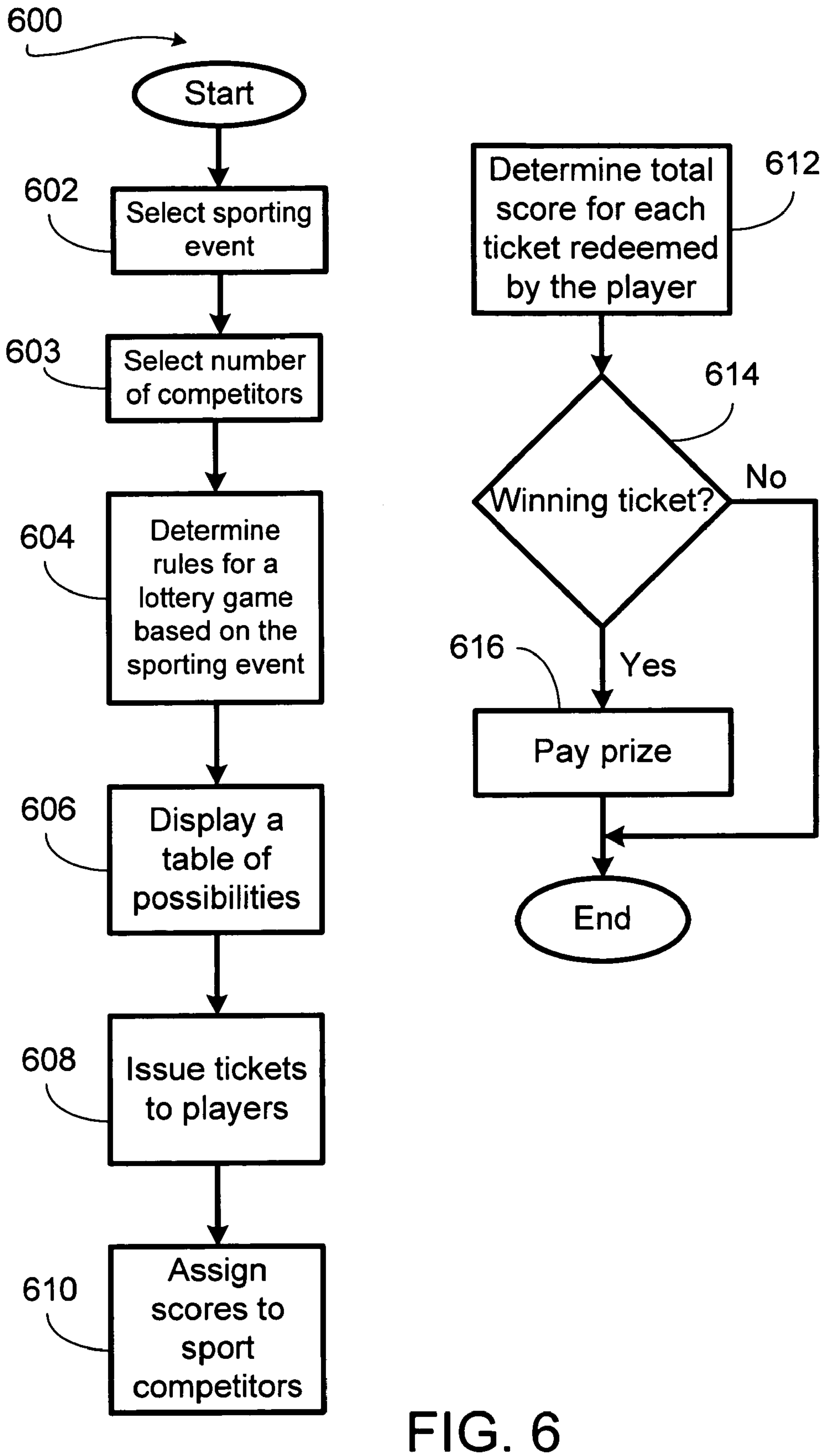
FIG. 6 is a flow chart for a lottery game process according to one embodiment of the invention.

FIG. 6 illustrates a flow chart 600 for a lottery game process according to one embodiment of the invention. The lottery authority selects one or more sporting events that will be available for the players to choose from, step 602. For each sporting event offered by the lottery authority, the latter also selects the type of selection for the number of competitors that will be available for the players to choose from, step 603. The lottery authority also determines the rules for the lottery game based on each of the sporting events, step 604. After the rules are determined, the lottery authority makes the table of possibilities, such as shown in FIGS. 2 and 4, available to the players, step 606. After a player purchases a ticket, the lottery authority issues a ticket to the player, step 608. The tickets can be issued by a sales terminal connected through a computer network to a central server controlled by the lottery authority. As the sporting event unfolds, a score is assigned to each competitor or team after each game, step 610. At the end of the tournament, the player may redeem his ticket at the sales terminal and the sales terminal will compute the score of the ticket, step 612. If the sales terminal determines the ticket is a winning ticket, step 614, the sales terminal will pay a prize to the player, step 616.

The foregoing descriptions present only exemplary embodiments. Those of ordinary skill in the art will readily recognize that the invention may be applied to a wide range of sports tournament structures and that even within a given tournament structure many variations are possible by adjusting the assignment of points to participants, for example by awarding more points for matches won in the later rounds of the tournament. Moreover, the invention may be applied to any reality-based event, sporting or otherwise, that results in the partition of a plurality of participants into a plurality of categories, where the plurality of participants within each category is known in advance. These applications and variations thereof are contemplated as being within the scope of the present invention.

What is claimed is:

1. A method of playing a fixed-odds sporting event tournament based lottery game wherein a pool of teams compete in the tournament, the method comprising the steps of:

a player in the lottery game designating a number that corresponds to a number of teams to be randomly generated for the player from the pool of teams, the player designated number being less than the total number of teams in the pool;

randomly assigning individual teams from the pool of teams to satisfy the player's designated number of teams;

assigning an individual score to each of the teams in the pool of teams according to their individual placement in the tournament, the individual score being assigned according to a set of predefined lottery game rules;

for each individual lottery game player, determining a total score for the randomly assigned teams based on the individual score of each of the plurality of teams; and the lottery game players receiving a prize as a function of the total score compared to a predefined score that merits the prize.

2. The method of claim 1, further comprising the steps of:

providing to the lottery game players a lottery ticket with the randomly assigned teams; and redeeming the lottery ticket for a prize.

3. The method of claim 1, further comprising the steps of:

providing a table with possible outcomes of the sporting event tournament according to the rules and the number of teams chosen by the player; and displaying the table to the players.

4. The method of claim 1, further comprising the step of receiving the results of the sporting event tournaments from a third party.

5. A computer-readable medium on which is stored a computer program for playing a fixed-odds sporting event based lottery game wherein a pool of teams compete in a sporting event tournament, rules of the sporting event tournament being established independently by a third party, the computer program comprising computer instructions that when executed by a computer performs the steps of:

randomly choosing individual teams from the pool of teams to satisfy a lottery game player's designation of a number of the teams that is less than the total number of teams in the pool;

issuing game tickets according to the random selection that identify the teams randomly generated for the lottery player to satisfy the player's designated number of teams;

assigning an individual score to each team in the pool of teams according to placement in the sporting event tournament, the individual score being assigned according to a set of predefined lottery game rules;

determining a total score for each game ticket redeemed by a player according to the individual score of each team selected for the player; and distributing a prize to each redeemed game ticket as a function of the total score compared to a predefined score that merits the prize.

6. The computer program of claim 5, further performing the steps of:

providing a table with possible outcomes of the sporting event tournament according to the rules and the number of chosen by the player; and displaying the table to players.

7. The computer program of claim 5, further performing the step of receiving the results of the sporting event tournaments from the third party.

8. A system of playing a fixed-odds sporting event based lottery game wherein a pool of teams compete in a sporting event tournament, comprising:

means for randomly assigning to players of the lottery game teams from the pool of teams in response to the lottery game player's designation of a number of teams that is less than the total number of teams in the pool;

means for assigning an individual score to each of the plurality of teams in the pool of teams according to their individual placement in the sporting event tournament, the individual score being assigned according to a set of predefined lottery game rules;

means for determining a total score for the teams randomly assigned to the lottery game players based on the individual score of each of the teams; and means for distributing a prize as a function of the total score compared to a predefined score that merits the prize.

9. The system of claim 8, further comprising:

means for providing a lottery ticket to individual lottery game players with the randomly assigned teams; and means for redeeming the lottery ticket for a prize.

10. The system of claim 8, further comprising:

means for providing a table with possible outcomes of the sporting event tournament according to the rules and the number of teams chosen by the player; and displaying the table to players.

* * * * *